United States Patent
Champlin et al.

(10) Patent No.: US 8,543,541 B2
(45) Date of Patent: *Sep. 24, 2013

(54) PREVENTING TRANSFER AND DUPLICATION OF REDUNDANTLY REFERENCED OBJECTS ACROSS NODES OF AN APPLICATION SYSTEM

(75) Inventors: Jonathan David Champlin, Cold Spring, NY (US); Gary Paul Rheaume, Barrington, NH (US); John Douglas Curtis, Millbury, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/558,458

(22) Filed: Jul. 26, 2012

(65) Prior Publication Data

US 2012/0291136 A1    Nov. 15, 2012

Related U.S. Application Data

(63) Continuation of application No. 12/509,899, filed on Jul. 27, 2009, now Pat. No. 8,290,904.

(51) Int. Cl.
 *G06F 17/30* (2006.01)
(52) U.S. Cl.
 USPC .......................... 707/626; 707/770; 707/803

(58) Field of Classification Search
 USPC .......................... 707/626, 770, 803
 See application file for complete search history.

(56) References Cited

U.S. PATENT DOCUMENTS

| | | | |
|---|---|---|---|
| 6,598,058 B2 * | 7/2003 | Bird et al. | 1/1 |
| 7,031,321 B2 * | 4/2006 | Habetha | 370/395.31 |
| 7,778,972 B1 | 8/2010 | Comie et al. | |
| 2006/0188327 A1 * | 8/2006 | Moon | 403/325 |
| 2007/0043733 A1 * | 2/2007 | Cannon et al. | 707/10 |
| 2007/0156842 A1 | 7/2007 | Vermeulen et al. | |
| 2009/0276754 A1 | 11/2009 | Lind et al. | |
| 2009/0316588 A1 * | 12/2009 | Nakamura | 370/249 |
| 2010/0281051 A1 * | 11/2010 | Sheffi et al. | 707/770 |
| 2010/0306280 A1 | 12/2010 | Sapek | |

* cited by examiner

*Primary Examiner* — Hanh Thai
(74) *Attorney, Agent, or Firm* — David A. Dagg

(57) ABSTRACT

Unique identifiers referred to as "keys" are generated for objects stored on each node. When a container object including at least one embedded object is transferred from a sending node to a receiving node, the sending node sends the key uniquely identifying the embedded object to the receiving node to determine whether the embedded object is already stored on the receiving node. If the receiving node indicates that the embedded object is already stored at the receiving node, then the sending node determines that the embedded object does not need to be sent to the receiving node. In that case, if the embedded object has not been sent, the sending node does not send the embedded object. If the sending node has already started sending the embedded object, then the sending node terminates sending of the embedded object.

28 Claims, 3 Drawing Sheets

PREVENTING TRANSFER AND DUPLICATION OF REDUNDANTLY REFERENCED OBJECTS ACROSS NODES OF AN APPLICATION SYSTEM

CROSS-REFERENCE TO RELATED APPLICATIONS

The present application is a Continuation application under 35 U.S.C. 120 of commonly owned prior application Ser. No. 12/509,899, filed on Jul. 27, 2009 in the names of Jonathan David Champlin et al., now allowed.

FIELD OF THE INVENTION

The present invention relates generally to application systems that use embedded content, and more specifically to preventing transfer and duplication of redundantly referenced objects across different nodes of an application system.

BACKGROUND OF THE INVENTION

As it is generally known, various specific types of distributed application systems transfer embedded content between nodes during their normal operation. The specific type of embedded "objects" transferred between nodes depends on the specific application. Examples of application systems that transfer embedded content objects between nodes include messaging systems that transfer messages with attachments, relational databases that use replication, and Web applications transferring XML data with embedded elements.

In such existing systems, one problem that arises is the duplication of large embedded objects that are transferred between nodes. When a document containing embedded content is transferred from a sending system to a receiving system, the embedded objects have to be sent to the receiving system regardless of whether they already exist on the receiving system or not. As a result, resources are wasted transferring redundant data between the nodes, and completion of the transfer operation is unnecessarily delayed while the redundant object(s) are transferred.

It would accordingly be desirable to have an automated solution that enables a distributed application to prevent transfer and duplication of redundantly referenced embedded objects across different nodes.

SUMMARY OF THE INVENTION

To address the above described and other shortcomings of previous approaches, a solution is disclosed that prevents transfer and duplication of redundantly referenced embedded objects across different nodes. Unique identifiers referred to as "keys" are generated for objects stored on each node. The keys generated by the disclosed system are deterministic with regard to the objects that they identify across multiple nodes on which the objects may be stored. Accordingly, if the same given object is stored on multiple different nodes, then the disclosed system generates the same key for that object at each of the nodes on which it is stored. When a container object including at least one embedded object is transferred from a sending node to a receiving node, the sending node sends the key uniquely identifying the embedded object to the receiving node to determine whether the embedded object is already stored on the receiving node. If the receiving node indicates that the embedded object is already stored at the receiving node, then the sending node determines that the embedded object does not need to be sent to the receiving node. In that case, if the embedded object has not been sent, the sending node does not send the embedded object. If the sending node has already started sending the embedded object, then the sending node terminates sending of the embedded object. Otherwise, if the receiving node does not indicate that embedded object is already stored at the receiving node, the sending node proceeds to send, or continues sending the embedded object.

In one embodiment, the key used to identify an embedded object is made up of a hash value generated by application of a hash function to the contents of the embedded object, plus some amount of metadata about the embedded object that further assists in uniquely identifying the object (e.g. object size)

In another embodiment, in the event that a receiving node indicates that an embedded object being transferred from a sending node is already stored at the receiving node, the receiving node increments a reference count associated with the embedded object indicating that the embedded object is associated with the containing object being transferred. As containing objects for the embedded object are deleted, the reference count for the embedded object is decremented. When the reference count reaches zero, the embedded object can be safely deleted.

The disclosed system advantageously enables a distributed application to prevent transfer and duplication of redundantly referenced embedded objects across different nodes. The disclosed system further advantageously allows interoperation with receiving nodes that do not implement checking for redundant objects, since sending nodes will send embedded objects in the absence of an indication that the receiving node already stores the embedded object.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
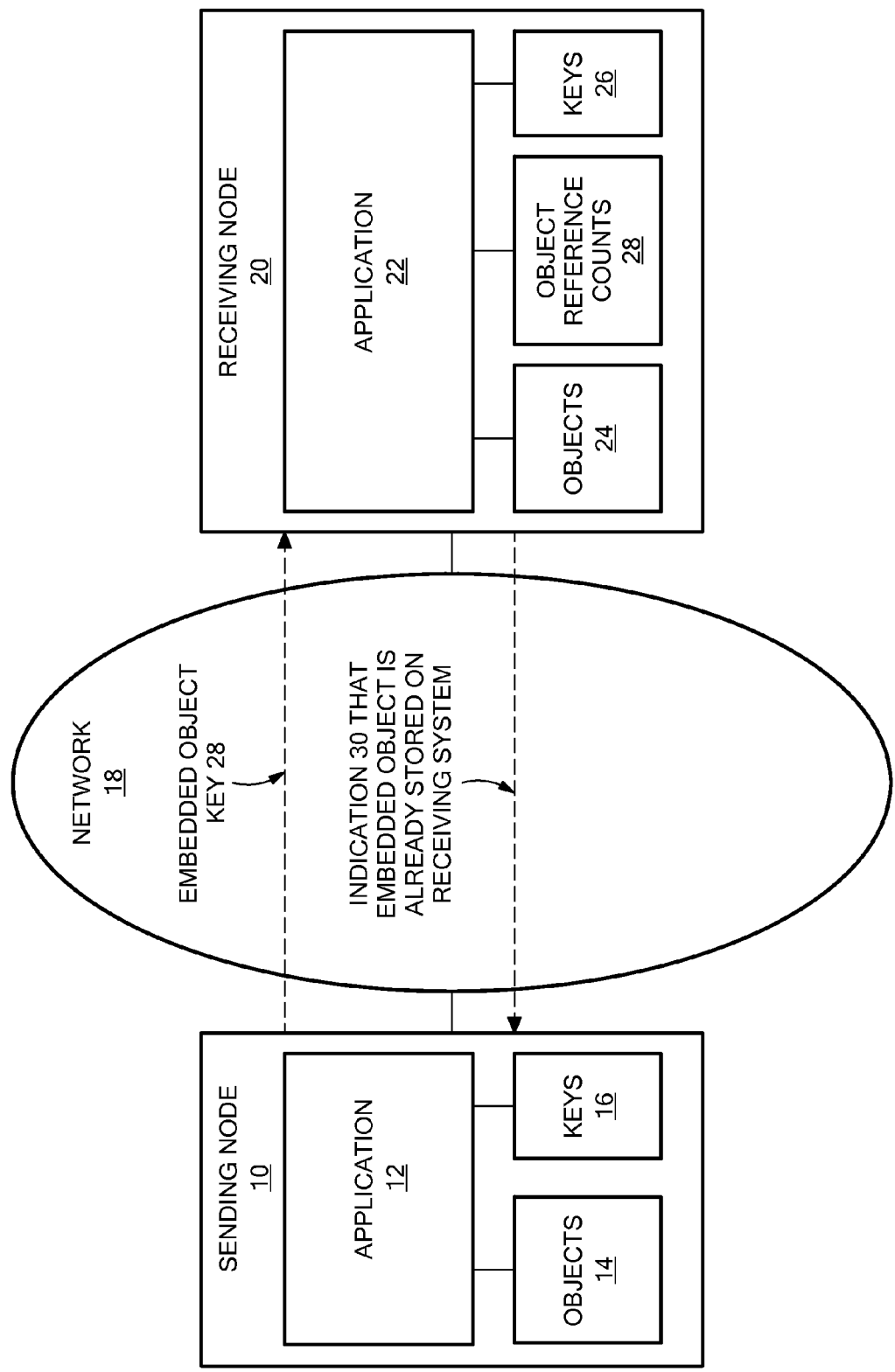
FIG. 1 is a block diagram showing hardware and/or software components in an illustrative embodiment of the disclosed system.

FIG. 1 is a block diagram showing hardware and/or software components in an illustrative embodiment of the disclosed system. As shown in FIG. 1, a Sending Node 10 includes Application 12, Objects 14 and Keys 16. Sending Node 10 is communicably connected with a Network 18, to which a Receiving Node 20 is also communicably connected. Receiving Node 20 is shown including Application 22, Objects 24, Object Reference Counts 28, and Keys 26.

Application 12 and Application 22 may, for example, be parts of a distributed application program, such as, for example, an electronic mail application, a relational database management application, a Web application or another specific type of application that communicates between nodes using XML (eXtensible Markup Language) streams. Objects 14 and Objects 24 may include any specific type of digital document or file processed or handled in some way by Application 12 and Application 22, such as, for example, application-specific formatted files (e.g. word processor documents, spreadsheet documents, etc.), database tables, electronic media content (e.g. sound files, video, etc.), messages (e.g. electronic mail messages and associated attachment files), and/or Web pages (e.g. HTML). As described in further detail below, the Keys 16 are identifiers associated with corresponding ones of the Objects 14, and Objects 26 are identifiers associated with corresponding ones of Objects 24. Object references counts 28 contain the number of current references to corresponding ones of the Objects 24.

During operation of the illustrative embodiment of FIG. 1, each of Application 12 and Application 22 maintain the keys identifying the objects stored on their respective node, such that the presence of a specific key on a node indicates that an object matching that key is stored on that node. Specifically, Application 12 maintains Keys 16 identifying the Objects 14 stored on Sending Node 10, such that if a given key is stored in Keys 16, then an object matching that key is stored in Objects 14. Similarly, Application 22 maintains Keys 26 identifying the Objects 24 stored on Sending Node 10, such that if a given key is stored in Keys 26, then an object matching that key is stored in Objects 24.

The disclosed system generates keys that are deterministic with regard to the objects that they identify, such that the same key will be generated for a given object at each of multiple nodes on which the object is stored. For example, if a first computer system includes a Portable Document Format (PDF) file stored within the electronic mail files of a first user, and a second user downloads the same file from a Web site to a second computer system, and a third user purchases a book including a CD containing the same file and copies the file from the CD onto a third computer system, the keys generated for the file on each of the three different computer systems will be the same, so that the disclosed system can detect from the matching keys that the files stored on the different computer systems are all the same file. The disclosed system may further be embodied such that the keys generated for a given file on two different nodes will be the same even in the case where the file has different names on the different nodes. In such an embodiment, the disclosed can accordingly detect that a file stored on a first node is the same as a file stored on a second node even if the file's name on the second node is different from the file's name on the first node.

Any specific technique may be used by Application 12 and Application 22 to generate the keys stored on their respective nodes. For example, in one embodiment, each application applies a hash function to each object stored on its respective node, and uses the resulting hash value as at least part of the key identifying that object. The key for each object may additionally include metadata describing the object that further assists in uniquely identifying the object, such as the object size or length. Examples of hashing functions that used in embodiments of the disclosed system include the SHA hash functions (SHA-1, SHA-2 and SHA-3), which are cryptographic hash functions designed by the National Security Agency (NSA) and published by the NIST as a U.S. Federal Information Processing Standard.

In one embodiment, Application 12 and Application 22 generate keys for respective ones of the objects stored on their respective nodes in response to a trigger event. For example, such a trigger event may be detected at the time each object is modified and saved, so that saving of an object causes a new key to be generated for the version of the object. In this way the set of keys on a node always matches the current versions of all the objects stored on that node.

Further during operation of the illustrative embodiment shown in FIG. 1, when Application 12 on Sending Node 10 determines that a container object containing at least one embedded object is to be transmitted to Receiving Node 20, Application 12 performs a size threshold test by comparing the size of the embedded object to a threshold minimum size. If the size of the embedded object meets or exceeds the threshold minimum size, Application 12 locates the key in Keys 16 that matches the embedded object. Alternatively, Application 12 may generate the key matching the embedded object in response to determining that the embedded object is to be transmitted to Receiving Node 20. Application 12 then sends the Embedded Object Key 28 to the Receiving Node 20. For example, the Embedded Object Key 28 may be sent in a descriptor for the container object or the like in an initial step or portion of the transmission of the container object from the Sending Node 10 to the Receiving Node 20. For example, in the case where transmission of the container object from the Sending Node 10 to the Receiving Node 20 includes an initial request to allocate an instance of the container object on the Receiving Node 20, the allocation request would include an object descriptor for the container object, the Embedded Object Key 28 is sent as part of the object descriptor for the container object. In this way, Application 12 in Sending Node 10 may perform a preliminary step indicating the identity of an embedded object to be sent to the Receiving Node 20, prior to sending the embedded object itself. In one embodiment, Application 10 in Sending Node 10 then operates by going ahead and beginning to send the container object including the embedded object itself as part of the transmission of the container object to the Receiving Node 20. Alternatively, Application 10 in Sending Node 10 may then wait until it receives a message indicating successful processing of the allocation request before beginning to transmit the container object and/or embedded object, where the message acknowledging successful processing of the allocation request also indicates whether or not the embedded object is already stored in the Receiving Node 20.

Upon receipt of the Embedded Object Key 28, Application 22 in Receiving Node 20 operates to determine whether there is an object in the Objects 24 that matches the Embedded Object Key 28. For example, Application 22 searches Keys 26 for a key matching Embedded Object Key 28. If a key is found in Keys 26 that matches Embedded Object Key 28, then Application 22 determines that the embedded object to be transferred in the container object from Sending Node 10 to Receiving Node 20 is already stored on Receiving Node 20 in Objects 24.

In response to determining that the embedded object to be transferred in the container object from Sending Node 10 to Receiving Node 20 is already stored on Receiving Node 20, Application 22 sends a message including an Indication that Embedded Object is Already Stored on Receiving System 20 to Application 12 on Sending Node 10. When Application 12 receives the Indication 30 that Embedded Object is Already Stored on Receiving System, it prevents transmission of the embedded object from Sending Node 10 to Receiving Node 20. For example, if Application 12 had started transmitting the container object with the embedded object to Receiving Node 20, upon receipt of Indication 30 that Embedded Object is Already Stored on Receiving System, Application 12 cancels or otherwise terminates any remaining portion of the transmission of the embedded object from the Sending Node 10 to the Receiving Node 20. Alternatively, if the Application 12 had waited until Application 22 provided a response to the Embedded Object Key 28 before transmitting the embedded object and/or container object, Application 12 would operate to send the container object without the embedded object.

If Application 22 determines that the embedded object identified by Embedded Object Key 28 is not already stored in Objects 24 (i.e. no key matching Embedded Key 28 is found in Keys 26), then Application 22 does not send Indication 30 that Embedded Object is Already Stored on Receiving System 30. In such a case, Application 22 may send an affirmative request (i.e. "Pull" operation) to the Sending Node 10 to obtain the embedded object. Alternatively, Application 22 may wait for the complete container object, including the embedded object, to be transmitted from the Sending Node 10.

In response to determining that the embedded object is already stored on Receiving Node 20, Application 22 stores a reference (i.e. pointer) to the separately stored embedded object within Objects 24 in the container document when the container document is stored on Receiving Node 20, and increments a reference count associated with the embedded object in Object Reference Counts 28. As each container object containing the embedded is deleted, Application 22 decrements the reference count for that object. When the reference count for the object reaches zero, Application 22 can safely delete the object from Objects 24.

In an embodiment where Application 12 and Application 22 are parts of an electronic mail system, and where Sending Node 10 is a client system and Receiving Node 20 is a server, the disclosed system advantageously operates to prevent objects that already exist on the server from having to be sent from each individual client, as may frequently occur as a user of Sending Node 20 replies to or forwards an electronic mail message containing one or more attachments.

The disclosed system similarly improves performance in the context of data replication operations between nodes of a variety of specific types of distributed systems. In an embodiment where Application 12 and Application 22 are parts of a relational database management system, when replicating rows of a database stored in Objects 14 and Objects 24, rows of the database are container objects that may contain embedded objects (columns) consisting of binary large objects (BLOBs). Two data streams between Sending Node 10 and Receiving Node 20 may be used. In a first operation, the Embedded Object Key 28 representing a BLOB column of a row is sent by Application 12 to the receiving node, in order to allow Application 22 to update the row on Receiving Node 20 by replacing the BLOB column with a reference to the BLOB as stored in Objects 24. If the BLOB is not already stored on Receiving Node 20, then Application 22 initiates a second operation to transfer the BLOB (in PULL mode) from the Sending Node 10 to Receiving Node 20. Once the BLOB is successfully stored in Objects 24, the row referring to the BLOB can also be written to Objects 24 and the entire unit of work committed.

In embodiment where Application 12 and Application 22 are parts of a Web application that uses XML streams to communicate between nodes, an embodiment of the disclosed system operates by the Application 12 creating a new XML element to replace the embedded object in the container object. The new XML element functions as a reference to the embedded object. When the containing XML document is to be sent from Sending Node 10 to Receiving Node 20, Application 12 performs an initial check to determine whether the embedded object is already stored on Receiving Node 20. If the embedded object is determined to already be stored on Receiving Node 20, then sending the container object with the reference element is sufficient, and the embedded object need not be sent. If the embedded object is not already stored on Receiving Node 20, then the embedded object is streamed from Sending Node 10 to Receiving Node 20 prior to streaming of the container XML object.

Other aspects of the operation of the components shown in the illustrative embodiment of FIG. 1 and other embodiments are described below.

The Sending Node 10 and Receiving Node 20 of FIG. 1 may be any specific type of computer systems and/or intelligent electronic devices, such as a desktop, laptop, or palmtop computer systems, and/or personal digital assistants, cell phones, or other electronic devices. Sending Node 10 and Receiving Node 20 each include or control display devices capable of displaying a graphical user interface to a respective local user, such as a liquid crystal display (LCD), cathode ray tube (CRT), interferometric modulator display (IMOD), light emitting diode (LED), or the like.

Those skilled in the art will further recognize that the Application 12 and Application 22 may be embodied using software or firmware, such as computer application program code, operating system program code, or middleware, and/or wholly or partly using digital hardware components, such as application specific integrated circuits (ASICs), field-programmable gate arrays (FPGAs), and the like, and/or combinations of hardware and/or software or firmware. Similarly, those skilled in the art will recognize that the Objects 14, Object 24, Keys 16, Keys 26, and Object Reference Counts 28 may consist or include any specific type of data structures and/or database technology. Moreover, the disclosed system is not limited to any specific node architecture, and may be embodied using client/server or peer to peer type architectures.

Those skilled in the art will further recognize that Sending Node 10 and Receiving Node 20 may each include one or more processors, and program and data storage, such as memory, for storing program code executable on such processors, as well as various input/output devices and/or interfaces. In the example of FIG. 1, Sending Node 10 and Receiving Node 20 are interconnected for purposes of illustration by Communication Network 18 (e.g. the Internet, a Local Area Network, etc.) through one or more of such input/output devices or interfaces, and through which may further be provided communication to a number of other client systems and/or remote server systems.

While for purposes of concise illustration a limited number of nodes are shown in FIG. 1, the disclosed system is not limited to any specific number of nodes. In addition, it will be clear to those skilled in the art that Sending Node 10 may further be embodied to additionally operate as a receiving node (and accordingly include a object reference counts for Objects 14), and Receiving Node 20 may further be embodied to operate as a sending node.

Figure 2:
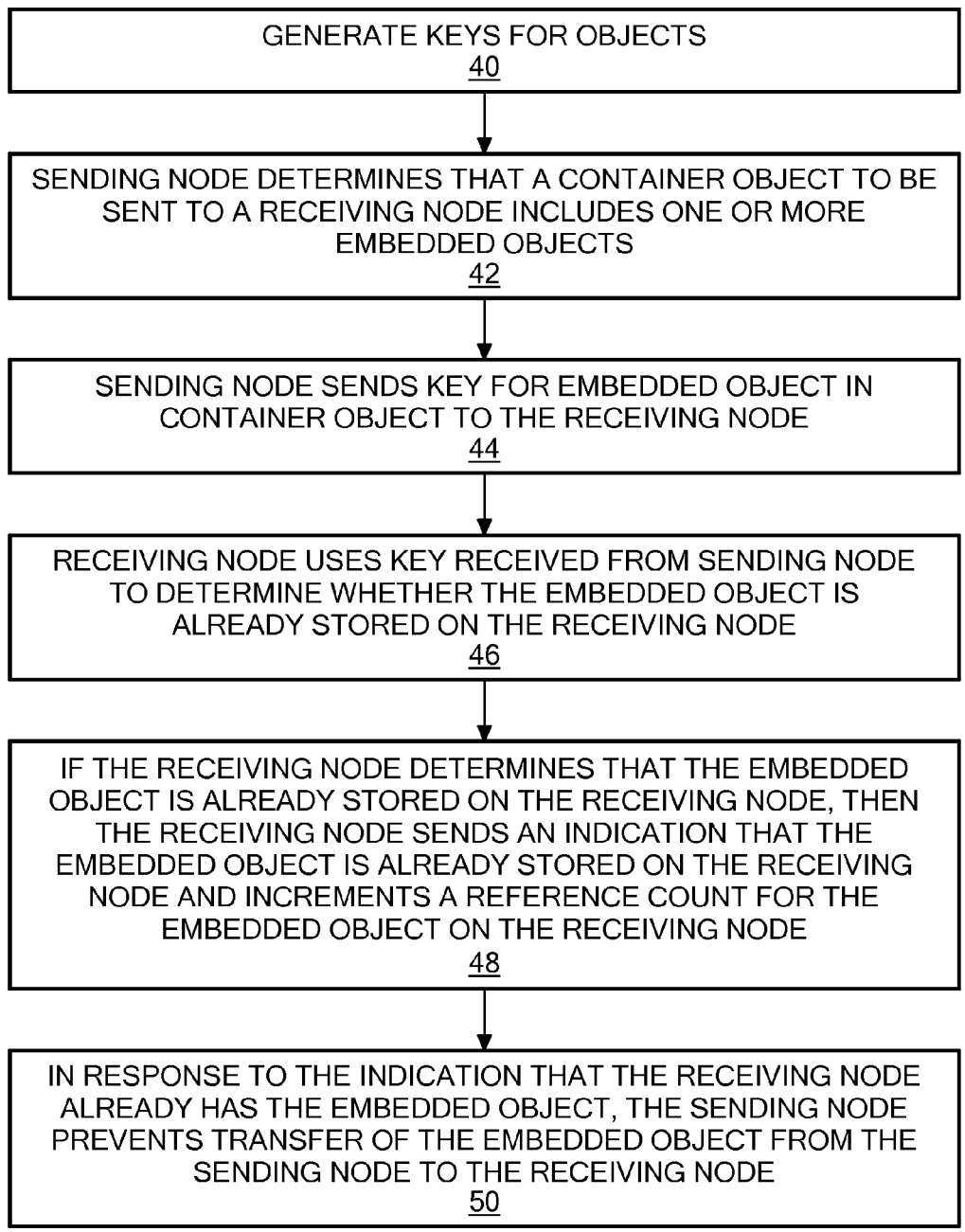
FIG. 2 is a flow chart showing steps performed during operation of an illustrative embodiment of the disclosed system.

FIG. 2 is a flow chart showing steps performed during operation of an illustrative embodiment of the disclosed system. While a specific set of steps and ordering of steps are shown for purposes of illustration and explanation in FIG. 2, the present invention is not limited to the specific steps shown in FIG. 2, or to the ordering of the steps shown in FIG. 2. At step 40, application program code in each node generates keys for objects stored on its respective node. At step 42, a sending node determines that a container object to be sent to a receiving node includes one or more embedded objects that meet or exceed a threshold size. In response to determining that the container object contains an embedded object meeting or exceeding the threshold size, the sending node sends a key for the embedded object to the receiving node at step 44.

At step 46, the receiving node uses the key received from the sending node to determine whether the embedded object is already stored on the receiving node. For example, the receiving node compares the received key with keys in the set of keys stored on the receiving node and representing the objects already stored on the receiving node. If the key received from the sending node matches one of the keys stored on the receiving node, then at step 48 the receiving node sends an indication to the sending node that the embedded object is already stored on the receiving node, writes a reference (i.e. pointer) to the received container object indicating the embedded object as stored on the receiving node, and increments the reference count for the embedded object on the receiving node. In response to receiving the indication sent from the receiving node that the embedded object is already stored on the receiving node, at step 50 the sending node prevents transfer of the embedded object from the sending node to the receiving node.

Figure 3:
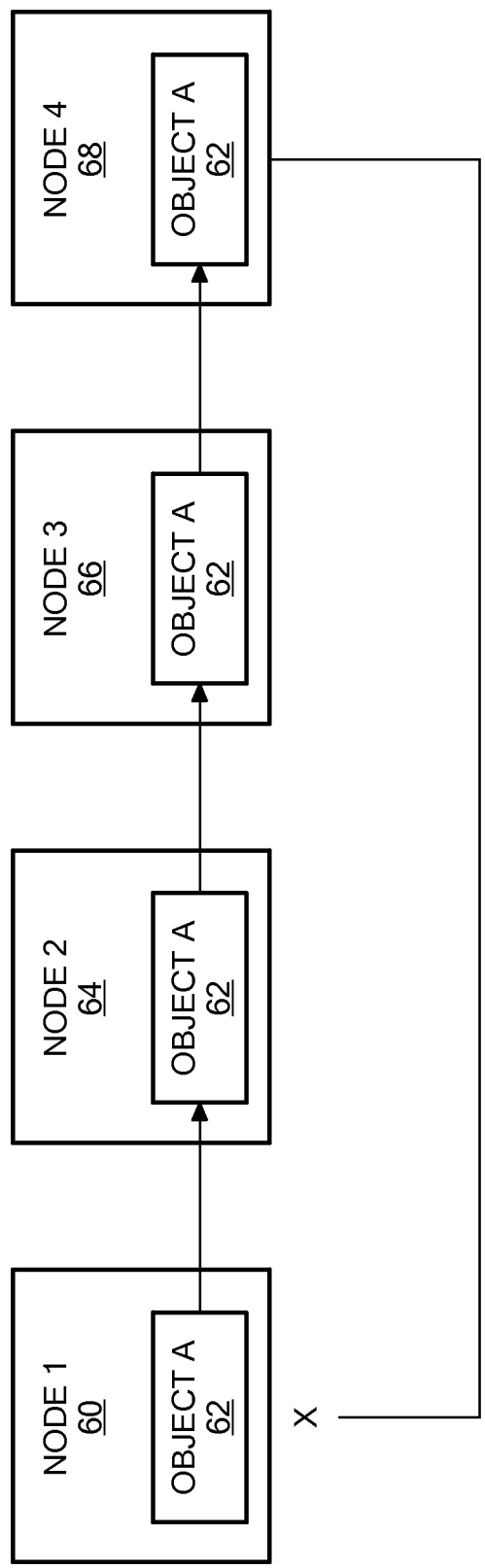
FIG. 3 is a block diagram showing an example of operation of an illustrative embodiment of the disclosed system.

FIG. 3 is a block diagram showing an example of operation of an illustrative embodiment of the disclosed system. As shown in FIG. 3, Object A 62 is transmitted from Node 1 60 to Node 2 64, and stored on Node 2 64. Similarly, Object A 62 is transmitted from Node 2 64 to Node 3 66 and stored on Node 3 66, and then transmitted from Node 3 66 to Node 4 68 and stored on Node 4 68. However, when Node 4 68 attempts to transmit Object A 62 back to Node 1 60, the disclosed system detects that Object A 62 is already stored on Node 1 60, and as a result prevents the transmission of Object A 62 from Node 4 68 to Node 1 60. While for purposes of illustration FIG. 3 shows an embedded object traversing four nodes, the disclosed system is not limited to any specific number nodes in this regard, and can accordingly operate across an arbitrary number of nodes.

The disclosed system provides many advantages over previous systems. For example, the disclosed system may be embodied such that sending systems that support the disclosed system do not wait for a response from a receiving system as to whether an embedded object is already stored on the receiving system before sending the embedded object to the receiving system. In this way, if the receiving system supports the disclosed system, and does provide an indication to the sending system that the embedded object is already stored on the receiving system, the sending system can operate on receipt of such an indication to stop transmitting the embedded object to the receiving system. If, on the other hand, a receiving system does not support the disclosed system, the sending system will provide the embedded object to the receiving system whether or not the embedded object is already stored on the receiving system. Such backwards compatibility advantageously allows a distributed system to operate using both nodes that include the disclosed system and nodes that do not include the disclosed system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A system comprising:
   at least one computer readable memory, said computer readable memory having stored thereon program code for preventing transfer and duplication of redundantly referenced embedded objects across different nodes, said program code including
   program code for generating a plurality of keys, each one of said keys identifying a corresponding one of a plurality of objects,
   program code for, by a sending node to a receiving node responsive to determining that an embedded object is to be transferred from said sending node to a receiving node with a container object, transferring one of said keys corresponding to said embedded object from said sending node to said receiving node;
   program code for transferring, by said sending node to said receiving node, said container object without said embedded object;
   program code for determining, by said receiving node responsive to said one of said keys received from said sending node, whether said embedded object is already stored on said receiving node;
   program code for, by said receiving node in response to determining that said embedded object is already stored on said receiving node, indicating to said sending node that said embedded object is already stored on said receiving node, storing a pointer to a copy of said embedded object into said container object received by said receiving node from said sending node, and incrementing a reference count associated with said embedded object in said receiving node; and
   program code for, by said sending node in response to receiving said indication that said embedded object is already stored on said receiving node, preventing transfer of said embedded object from said sending node to said receiving node with said container object.

2. The system of claim 1, further comprising:
   wherein said program code for generating said plurality of keys generates a key for each corresponding one of said plurality of objects responsive to said corresponding one of said plurality of objects being saved.

3. The system of claim 1, further comprising:
   wherein said program code for generating said plurality of keys includes program code for applying a hash function to each corresponding one of said plurality of objects and wherein each one of said keys includes an output of said hash function applied to said corresponding one of said plurality of objects.

4. The system of claim 3, wherein each one of said keys further comprises metadata describing said corresponding one of said plurality of objects.

5. The system of claim 4, wherein said metadata includes a size of said corresponding one of said plurality of objects.

6. The system of claim 1, further comprising:
   wherein said container object comprises an electronic mail message; and
   wherein said embedded object comprises an attachment to said electronic mail message.

7. The system of claim 1, further comprising:
   wherein said container object comprises a row in a relational database; and
   wherein said embedded object comprises a binary large object (BLOB) contained in said row.

8. The system of claim 1, further comprising:
   wherein said container object comprises an XML (eXtendsible Markup Language) document; and
   wherein said embedded object comprises an data object within said XML document.

9. The system of claim 1, further comprising:
   wherein said program code for sending one of said keys corresponding to said embedded object being transferred in said container object includes program code for sending said one of said keys corresponding to said embedded object together with an initial portion of said container object.

10. The system of claim 9, further comprising:
wherein said program code for preventing transfer of said embedded object from said sending node to said receiving node includes program code for stopping transfer of said embedded object after transfer of said embedded object has already started.

11. The system of claim 1, further comprising:
program code in said receiving node for decrementing said reference count responsive to determining that an object containing said embedded object has been deleted; and
program code in said receiving node for deleting said embedded object responsive to said reference count being decremented to zero.

12. The system of claim 1, wherein said plurality of objects comprises a plurality of electronic documents.

13. The system of claim 1, further comprising:
wherein said sending node and said receiving node each comprise a computer system including at least one processor; and
wherein said sending node and said receiving node are interconnected by at least one computer network.

14. The system of claim 1, wherein said program code for transferring said one of said keys corresponding to said embedded object from said sending node to said receiving node transfers said one of said keys in a descriptor for said container object.

15. The system of claim 1, wherein said program code for transferring said one of said keys corresponding to said embedded object from said sending node to said receiving node transfers said one of said keys in a request to allocate an instance of said container object on said receiving node.

16. The system of claim 15, wherein said program code for indicating to said sending node that said embedded object is already stored on said receiving node sends an indication that said embedded object is already stored on said receiving node in a message acknowledging successful processing of said request to allocate an instance of said container object on said receiving node.

17. A computer program product, comprising:
at least one non-transitory computer readable storage medium, said computer readable storage medium having stored thereon program code for preventing transfer and duplication of redundantly referenced embedded objects across different nodes, said program code including
program code for generating a plurality of keys, each one of said keys identifying a corresponding one of a plurality of objects,
program code for, by a sending node to a receiving node responsive to determining that an embedded object is to be transferred from said sending node to said receiving node with a container object, transferring one of said keys corresponding to said embedded object from said sending node to said receiving node;
program code for transferring, by said sending node to said receiving node, said container object without said embedded object;
program code for determining, by said receiving node responsive to said one of said keys received from said sending node, whether said embedded object is already stored on said receiving node;
program code for, by said receiving node in response to determining that said embedded object is already stored on said receiving node, indicating to said sending node that said embedded object is already stored on said receiving node, storing a pointer to a copy of said embedded object into said container object received by said receiving node from said sending node, and incrementing a reference count associated with said embedded object in said receiving node; and
program code for, by said sending node in response to receiving said indication that said embedded object is already stored on said receiving node, preventing transfer of said embedded object from said sending node to said receiving node with said container object.

18. A computer-implemented method for preventing transfer and duplication of redundantly referenced embedded objects across different nodes, comprising:
generating a plurality of keys, each one of said keys identifying a corresponding one of a plurality of objects;
transferring, by a sending node to a receiving node responsive to determining that an embedded object is to be transferred from said sending node to said receiving node with a container object, one of said keys corresponding to said embedded object from said sending node to said receiving node;
determining, by said receiving node responsive to said one of said keys received from said sending node, whether said embedded object is already stored on said receiving node;
indicating, to said sending node by said receiving node in response to determining that said embedded object is already stored on said receiving node, that said embedded object is already stored on said receiving node;
storing, by said receiving node in response to determining that said embedded object is already stored on said receiving node, a pointer to a copy of said embedded object into said container object received by said receiving node from said sending node;
incrementing, by said receiving node in response to determining that said embedded object is already stored on said receiving node, a reference count associated with said embedded object in said receiving node; and
preventing, by said sending node in response to receiving said indication that said embedded object is already stored on said receiving node, transfer of said embedded object from said sending node to said receiving node with said container object.

19. The method of claim 18, further comprising:
wherein said generating said plurality of keys includes generating a key for each corresponding one of said plurality of objects responsive to said corresponding one of said plurality of objects being saved.

20. The method of claim 18, further comprising:
wherein said generating said plurality of keys includes for applying a hash function to each corresponding one of said plurality of objects and wherein each one of said keys includes an output of said hash function applied to said corresponding one of said plurality of objects.

21. The method of claim 20, wherein each one of said keys further comprises metadata describing said corresponding one of said plurality of objects.

22. The method of claim 21, wherein said metadata includes a size of said corresponding one of said plurality of objects.

23. The method of claim 18, further comprising:
wherein said container object comprises an electronic mail message; and
wherein said embedded object comprises an attachment to said electronic mail message.

24. The method of claim 18, further comprising:
wherein said container object comprises a row in a relational database; and
wherein said embedded object comprises a binary large object (BLOB) contained in said row.

25. The method of claim 18, further comprising:
wherein said container object comprises an XML (eXtendsible Markup Language) document; and
wherein said embedded object comprises an data object within said XML document.

26. The method of claim 18, further comprising:
wherein said sending one of said keys corresponding to said embedded object being transferred in said container object includes sending said one of said keys corresponding to said embedded object together with an initial portion of said container object.

27. The method of claim 26, further comprising:
wherein said preventing transfer of said embedded object from said sending node to said receiving node includes stopping transfer of said embedded object after transfer of said embedded object has already started.

28. The method of claim 18, further comprising:
decrementing, by said receiving node, said reference count responsive to determining that an object containing said embedded object has been deleted; and
deleting, by said receiving node, said embedded object responsive to said reference count being decremented to zero.

* * * * *